US011625100B2

(12) United States Patent
Brown et al.

(10) Patent No.: US 11,625,100 B2
(45) Date of Patent: Apr. 11, 2023

(54) HAPTIC BUTTON

(71) Applicant: CAMBRIDGE MECHATRONICS LIMITED, Cambridge (GB)

(72) Inventors: Andrew Benjamin David Brown, Cambridge (GB); James Howarth, Cambridge (GB); Thomas James Powell, Cambridge (GB); Eugene Yu Jen Ho, Cambridge (GB); Jonathan Morgan, Cambridge (GB)

(73) Assignee: CAMBRIDGE MECHATRONICS LIMITED, Cambridgeshire (GB)

( * ) Notice: Subject to any disclaimer, the term of this patent is extended or adjusted under 35 U.S.C. 154(b) by 0 days.

(21) Appl. No.: 16/619,188

(22) PCT Filed: Jun. 5, 2018

(86) PCT No.: PCT/EP2018/064803
§ 371 (c)(1),
(2) Date: Dec. 4, 2019

(87) PCT Pub. No.: WO2018/224514
PCT Pub. Date: Dec. 13, 2018

(65) Prior Publication Data
US 2020/0117274 A1    Apr. 16, 2020

(30) Foreign Application Priority Data

Jun. 6, 2017   (GB) ..................... 1709011
Jun. 15, 2017  (GB) ..................... 1709498
Aug. 2, 2017   (GB) ..................... 1712434

(51) Int. Cl.
*G06F 3/01*    (2006.01)
*G06F 3/02*    (2006.01)

(52) U.S. Cl.
CPC ............ *G06F 3/016* (2013.01); *G06F 3/0202* (2013.01)

(58) Field of Classification Search
CPC . G06F 3/016; G06F 3/0202; H01H 2003/008; H01H 2215/05; H01H 13/85; H01H 2209/058; H01H 2209/036; H01H 2209/08
See application file for complete search history.

(56) References Cited

U.S. PATENT DOCUMENTS

| | | | |
|---|---|---|---|
| 7,893,922 B2 * | 2/2011 | Klinghult | G06F 3/016 178/17 C |
| 9,068,561 B2 * | 6/2015 | Gondo | F03G 7/065 |
| 9,396,629 B1 | 7/2016 | Weber | |
| 9,564,029 B2 * | 2/2017 | Morrell | G06F 3/016 |
| 10,691,211 B2 * | 6/2020 | Amin-Shahidi | H01F 7/0289 |
| 2005/0098413 A1 * | 5/2005 | Uehira | H01H 61/0107 200/5 R |

(Continued)

FOREIGN PATENT DOCUMENTS

WO    2004/081776 A1    9/2004
WO    2013/148641 A1    10/2013

*Primary Examiner* — Temesghen Ghebretinsae
*Assistant Examiner* — Karin Kiyabu
(74) *Attorney, Agent, or Firm* — Haley Guiliano LLP

(57) ABSTRACT

Broadly speaking, embodiments of the present techniques provide apparatus and methods for providing haptic feedback, and in particular to user-operated buttons for electrical and electronic products that provide haptic feedback to the user when operated.

16 Claims, 5 Drawing Sheets

(56) References Cited

U.S. PATENT DOCUMENTS

| | | |
|---|---|---|
| 2009/0001855 A1 | 1/2009 | Lipton et al. |
| 2009/0178913 A1* | 7/2009 | Peterson ................. G06F 3/016 200/5 A |
| 2011/0102326 A1* | 5/2011 | Casparian ............... G06F 3/016 345/168 |
| 2012/0212442 A1* | 8/2012 | Uchida ................... G06F 3/016 345/173 |
| 2013/0044049 A1 | 2/2013 | Biggs et al. |
| 2013/0154984 A1 | 6/2013 | Gondo |
| 2017/0194114 A1* | 7/2017 | Towers .................. H01H 13/52 |
| 2017/0228028 A1* | 8/2017 | Nakamura .............. G06F 3/011 |
| 2017/0284379 A1* | 10/2017 | Krumpelman .......... F03G 7/065 |
| 2018/0107378 A1* | 4/2018 | Rosenberg .......... G06F 3/04144 |

\* cited by examiner

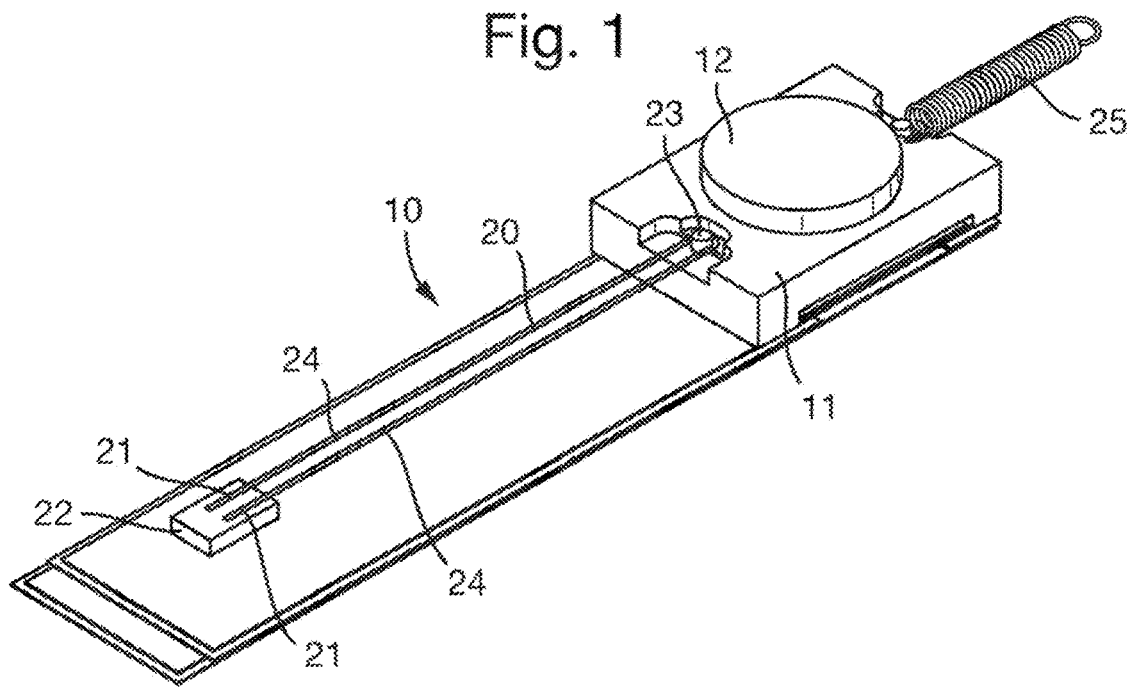
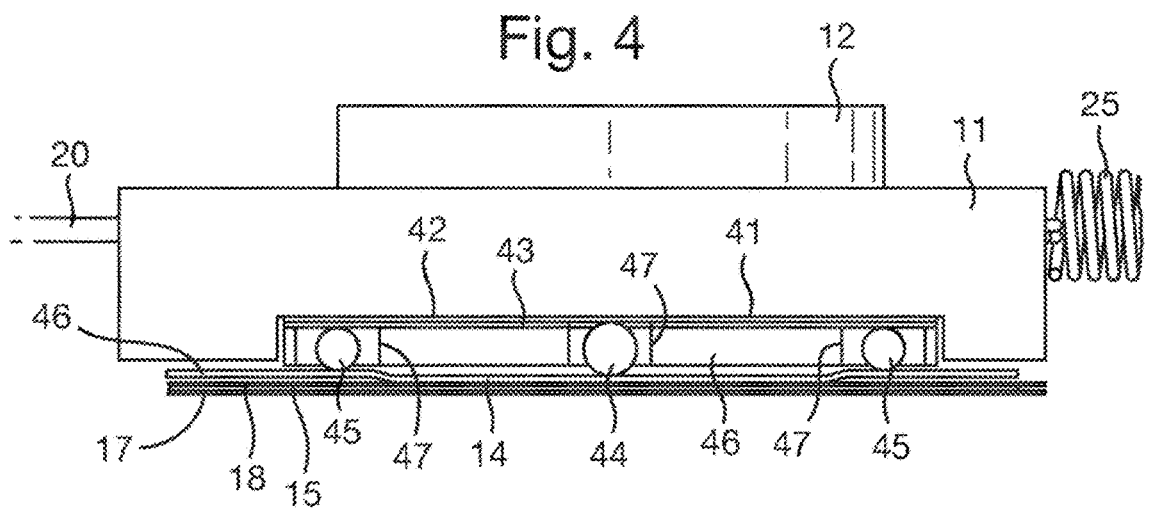
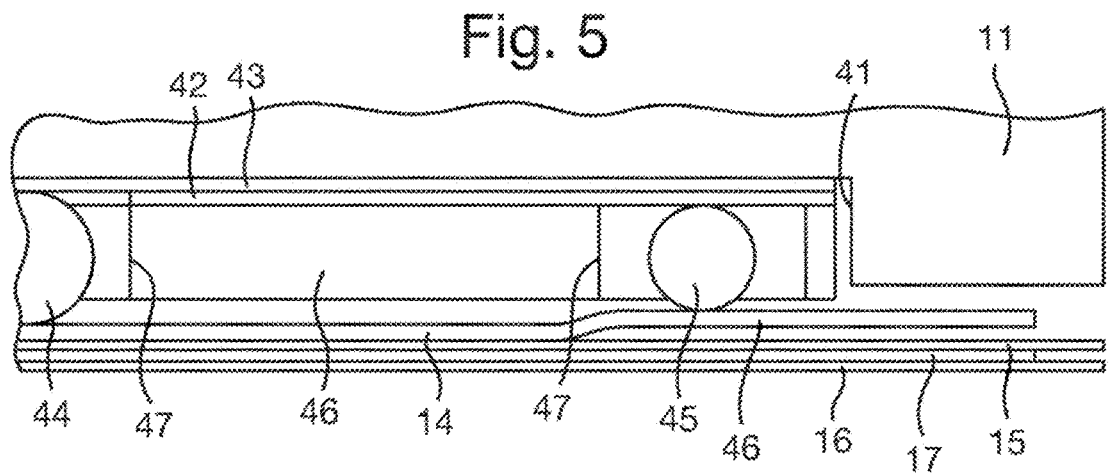

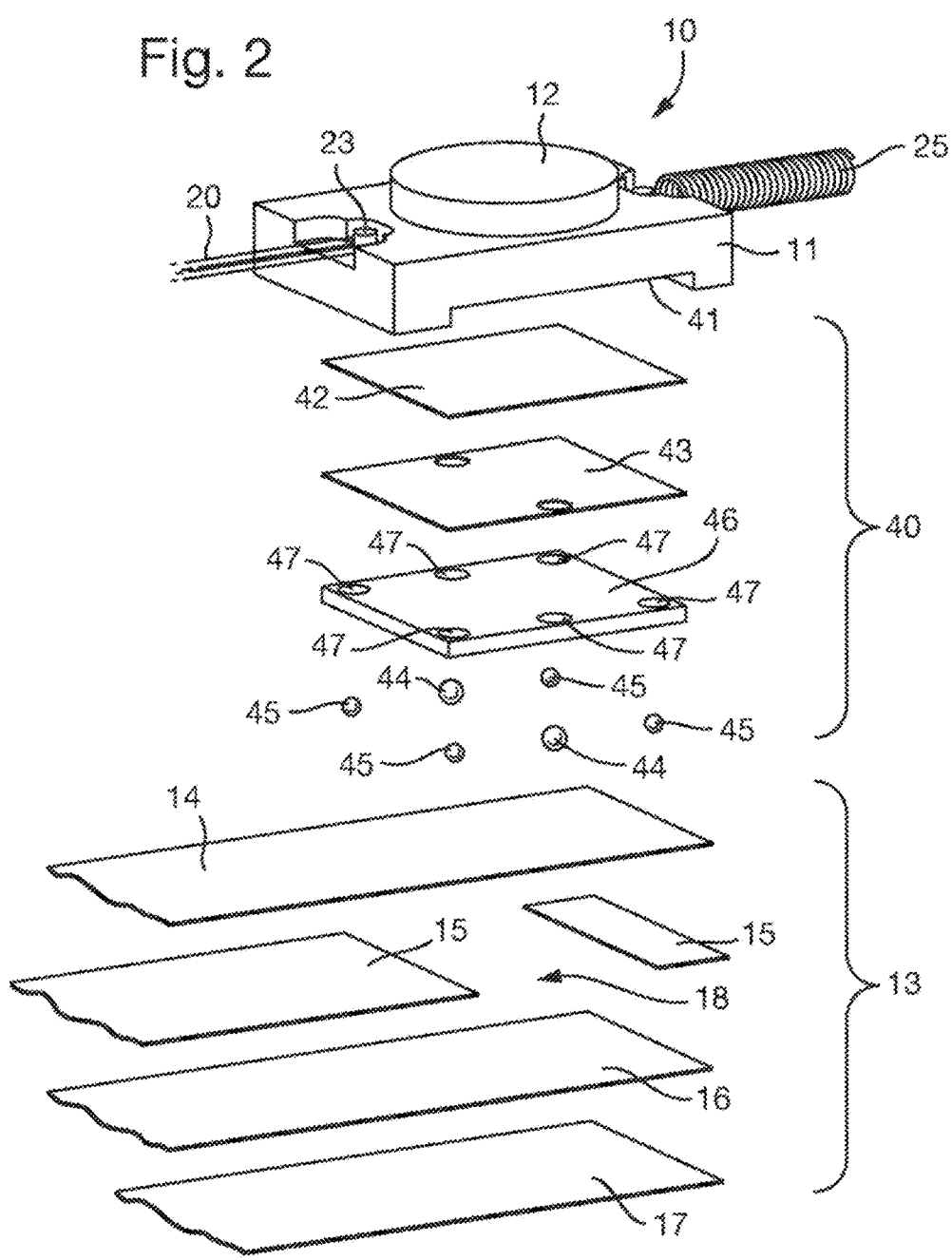

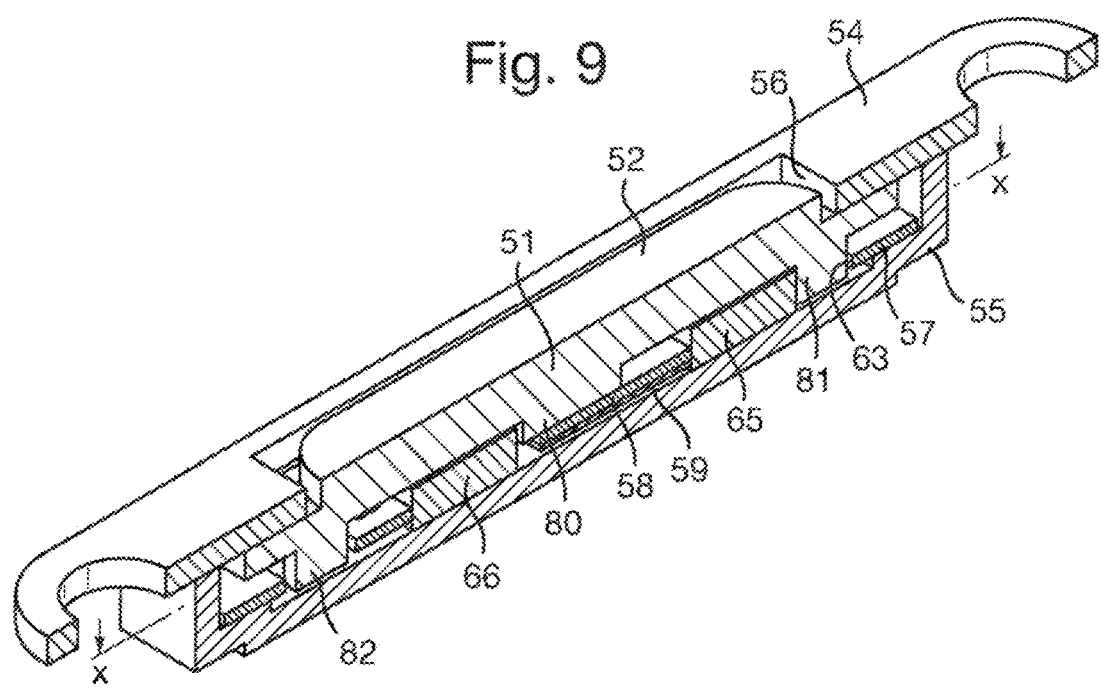
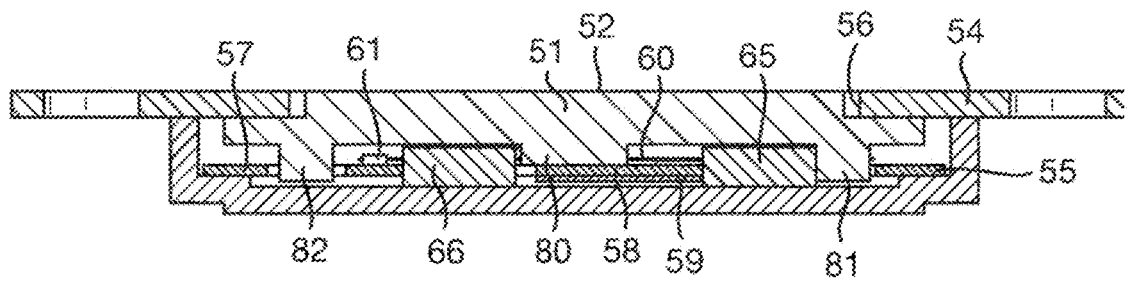
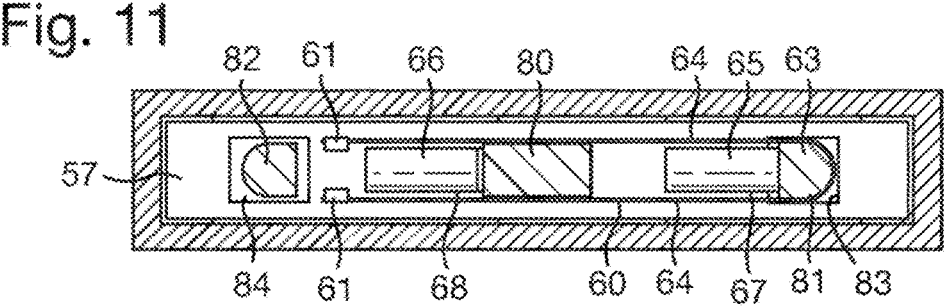
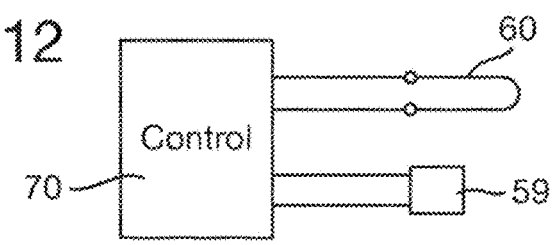

HAPTIC BUTTON

CROSS-REFERENCE TO RELATED APPLICATIONS

This application is a national stage application under 35 U.S.C. § 371 of International Application PCT/EP2018/064803, filed Jun. 5, 2018, which claim priority of GB Patent Applications 1709011.9 filed Jun. 6, 2017, 1709498.8 filed Jun. 15, 2017, and 1712434.8 filed Aug. 2, 2017. The disclosure of which are hereby incorporated by reference herein in their entireties.

The present application generally relates to apparatus and methods for providing haptic feedback, and in particular to user-operated buttons for electrical and electronic products that provide haptic feedback to the user when operated.

Consumer electronics devices employ different designs of buttons to give users haptic feedback about operation of the button, that is feedback which the user can feel through touch. In the case of a button, such haptic feedback may be a tactile sensation or force felt by the user through a finger that operates the button.

In the case of computer keyboards and smartphone buttons, the most popular designs are dome switches and leaf springs, which provide haptic feedback due to the mechanical response of the components changing the resistance force that resists pressing of the button which is felt by the user. The exact force profile of the resistance force during operation itself is often tuned into the mechanical design to satisfy a target user preference.

In mobile consumer electronic devices, space is at a premium and it is therefore advantageous to produce a button or switch with a very low profile. A low-profile button necessarily has little travel and therefore little scope to produce a satisfying tactile response to the user, particularly if it is also desired to have a low or near zero force requirement to create and/or maintain an electrical contact.

Commonly used mechanical buttons such as the dome switch and the leaf spring switch have been replaced on the front face of many smartphones by capacitive buttons. In this technology, the button is not required to protrude from the device and has zero force requirement to create the electrical contact. This allows smooth mechanical designs of the smartphone casework and reduces fatigue of the user if pressing the button many times within a short time. However, unlike the mechanical designs, these products are entirely passive mechanically and as such do not provide any tactile feedback. In addition, a mechanical switch can be configured to detect the force applied to it and thus allow multiple functions to be applied to a single device dependent on the force used or the duration of time that the switch is depressed; a capacitive button is not able to do this.

The present applicant has identified a need for a button that is able to provide haptic feedback in a button design that is compact and may be operated with a minimal amount of button travel.

According to a first approach of the present techniques, there is provided a button assembly, comprising: a button having a pressable surface; a contact portion beneath the button, the contact portion being depressable; a sensor arrangement arranged to sense depression of the contact portion; a shape memory alloy actuator arranged to drive movement of the button relative to the contact portion in a lateral direction with respect to the direction of travel of the button when pressed; at least one primary bearing element arranged to contact and depress the contact portion when the button is pressed, and to bear said movement of the button in said lateral direction without breaking contact with the contact portion when the button is pressed.

The button assembly of the present techniques comprises a contact portion that detects contact between a user (e.g. a user's finger) and the button. The contact portion is provided below the button and may depress, deflect or bend when the button is pressed by a user. The contact portion may be, for example, a thin layer of material (e.g. a thin metal sheet) which may depress, deflect or bend when the button is pressed, or a plunger-like element which may exert a force onto another element when the button is pressed. The button assembly also comprises a sensor arrangement arranged to sense/detect the depression/deflection/bending of the contact portion. In embodiments, the contact portion may form an electrical connection with the sensor arrangement when the contact portion is depressed/deflected/bent. When the sensor arrangement senses/detects that the shape, form or arrangement of the contact portion has changed, the sensor arrangement may communicate this information to control circuitry to cause a drive signal to be applied to the shape memory alloy actuator (to drive movement of the button relative to the contact portion).

The button assembly may use a sensor arrangement to sense depression of a contact portion when the button is pressed. Thus, the button assembly may not employ a capacitive sensor and instead may be operated by a button which undergoes a degree of travel when pressed.

The button assembly uses a shape memory alloy actuator to drive said movement of the button in said lateral direction with respect to the direction of travel of the button when pressed. This movement in the lateral direction may be used to provide a haptic effect when the button is pressed. In particular, this movement in the lateral direction may give a tactile sensation to the user that may be perceived as a change in the resistance force against pressing of the button, even though downwards movement of the button is minimal. Furthermore, as an SMA actuator is used to provide a haptic effect, the button assembly may not need to incorporate a mechanical arrangement to control the resistance force that resists pressing of the button. This may allow for a compact, low-profile design of the button assembly in which the travel of the button may be minimised. The sensor arrangement may be simple because it merely senses depression of the contact portion.

The use of a shape memory alloy (SMA) as an actuator, for example in the form of SMA wire, provides a high force and rapid response that is suitable for providing a haptic effect that may be sensed by the user, but in a form that is very compact due to the relative high force to size ratio of SMA material.

However, when an SMA actuator is used to drive movement of the button, it remains necessary to provide reliable operation of the button that is not compromised by the travel of the button. The present techniques may achieve this by providing a primary bearing element to contact and depress the contact portion when the button is pressed wherein the primary bearing element also bears the movement of the button in the lateral direction without breaking contact with the contact portion when the button is pressed. Such use of a bearing element to both depress the contact portion and to bear the movement of the button in the lateral direction ensures reliable operation of the button when the haptic effect is provided.

Advantageously, the primary bearing element may contact the contact portion continuously and support the button thereon. This arrangement may have the benefit of reducing the travel of the button needed to depress the contact portion, because there is no lost travel between the button and the contact portion. Accordingly, both the travel and the dimensions of the button assembly may be reduced. There are applications where it may be beneficial to ensure the contact is maintained and not intermittent. For example, the button may be used in applications where precise timing of pressing the button is needed, for example when controlling a computer game. Similarly, this may be advantageous in applications where multiple functions are assigned to the button, which are enacted by different periods of pressing the button.

Advantageously, the primary bearing element may be aligned with the geometric centre of the pressable surface. This assists in transfer of the force applied to the button to the contact portion.

In one arrangement, the button assembly may further comprise: at least one resilient element arranged laterally beside the primary bearing element; and at least one secondary bearing element, which is in contact with the resilient element and supports the button thereon, and the resilient element being arranged to accommodate travel of the button and the at least one secondary bearing element being arranged to bear said movement of the button in the lateral direction. In such an arrangement, the resilient element reduces tilt of the button when it is pressed.

By disposing secondary bearing elements on opposite sides of the primary bearing element, the reduction of tilt may be improved. In such a case, the secondary bearing elements are preferably disposed on opposite sides of the primary bearing element in a lateral direction and the shape memory alloy actuator is arranged to drive said movement in that lateral direction. In this manner, the secondary bearing elements are more effective in bearing the motion of the button in the lateral direction.

In another arrangement, the button assembly may further comprise: a support on which the contact portion is mounted; and at least one stopper element protruding from the button, the at least one stopper element being spaced from the support by a clearance that limits tilt of the button. In such an arrangement, the stopper element reduces tilt of the button when it is pressed.

By disposing stopper elements on opposite sides of the primary bearing element, the reduction of tilt may be improved. In such a case, the stopper elements are preferably disposed on opposite sides of the primary bearing element in a lateral direction and the shape memory alloy actuator is arranged to drive said movement in that lateral direction. In this manner, the stopper elements are more effective in bearing the relative lateral motion of the button.

Advantageously, both ends of the shape memory alloy wire may be fixed relative to the contact portion and the shape memory alloy wire may be hooked at an intermediate position around a retaining portion formed on the button. In this case, the two parts of the shape memory alloy wire that extend from the retaining portion may be arranged to drive the movement of the button in the lateral direction in parallel. This increases the force applied by the SMA wire, while retaining a compact arrangement. In this case, the following features may additionally be applied in any combination to obtain a compact arrangement:

The two parts of the shape memory alloy wire which extend from the retaining portion may be located beneath the pressable surface of the button. This minimises the footprint of the button assembly.

The primary bearing may be located between the two parts of the shape memory alloy wire that extend from the retaining portion.

The button assembly may further comprise at least one resilient biasing element arranged to resiliently bias the shape memory alloy actuator, in which case the at least one resilient biasing element may also be located between the two parts of the shape memory alloy wire which extend from the retaining portion.

The bearing element may be any suitable type of bearing. For example, the bearing element may be a bearing ball or a sliding bearing member protruding from the button. The use of a sliding bearing member has particular advantages in providing a simple and compact arrangement, without compromising the bearing function. The use of a bearing ball has particular advantages of having a relatively low degree of friction, so may be preferable in applications where the force requirement is relatively high. The bearing element may be a flexure, a flexure pin or a roller pin, for example.

The SMA actuator may comprise SMA wire. The diameter of the SMA wire is selected to provide the desired balance of force, stroke and efficiency. The SMA wire preferably has a diameter of 100 microns or less, or more preferably has a diameter of 35 microns or less.

The sensor arrangement may be of any type suitable for sensing depression of the contact portion when the button is pressed. Desirably, the sensor arrangement is provided with a simple construction that minimises the travel and the size of the button assembly.

One possibility is that the contact portion comprises a first switch element and the sensor arrangement comprises a second switch element arranged such that depression of the contact portion brings the switch elements into electrical contact. This implements the sensor arrangement in an extremely simple switch arrangement that is reliable and meets the desire to minimise the travel and the size of the button assembly.

An alternative is that the sensor arrangement comprises a strain gauge, which may for example be fixed to the contact portion. This alternative also implements the sensor arrangement in an extremely simple switch arrangement that is reliable and meets the desire to minimise the travel and the size of the button assembly.

For example, the strain gauge may comprise a sheet whose resistance varies as the sheet is strained. In such a case, the height of the button assembly is minimised as the sheet may itself be relatively thin and therefore needs to be provided only with sufficient clearance to accommodate the depression of the contact portion.

According to a second approach of the present techniques, there is provided a method for delivering a haptic sensation using a button assembly of the types described herein, the method comprising: sensing depression of the contact portion; and applying a drive signal to the shape memory alloy actuator to drive movement of the button relative to the contact portion.

The method may comprise selecting, prior to applying the drive signal, a drive signal from a set of drive signals, where each drive signal provides a particular haptic effect.

According to a third approach of the present techniques, there is provided circuitry for delivering a haptic sensation using a button assembly of the types described herein, the circuitry comprising: a detection module for sensing depression of the contact portion; and a drive module for applying a drive signal to the shape memory alloy actuator to drive movement of the button relative to the contact portion.

The drive module may select, prior to applying the drive signal, a drive signal from a set of drive signals, where each drive signal provides a particular haptic effect.

In a related approach of the present techniques, there is provided a non-transitory data carrier carrying processor control code to implement any of the methods described herein.

Preferred features are set out in the appended dependent claims.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Implementations of the present techniques will now be described, by way of example only, with reference to the accompanying drawings, in which:

FIG. 1 is a perspective view of a first button assembly;

FIG. 2 is an exploded perspective view of the first button assembly;

FIG. 3 is a diagram of a control circuit of the first button assembly;

FIG. 4 is a side view of the first button assembly;

FIG. 5 is an enlarged part of FIG. 3;

FIG. 9 is a cut-away perspective view of the second button assembly;

FIG. 10 is a cross-sectional side view of the second button assembly showing the cut-away portion of FIG. 9;

FIG. 11 is a cross-sectional plan view of the second button assembly taken along line X-X in FIG. 9; and FIG. 12 is a diagram of a control circuit of the second button assembly.

Figure 6:
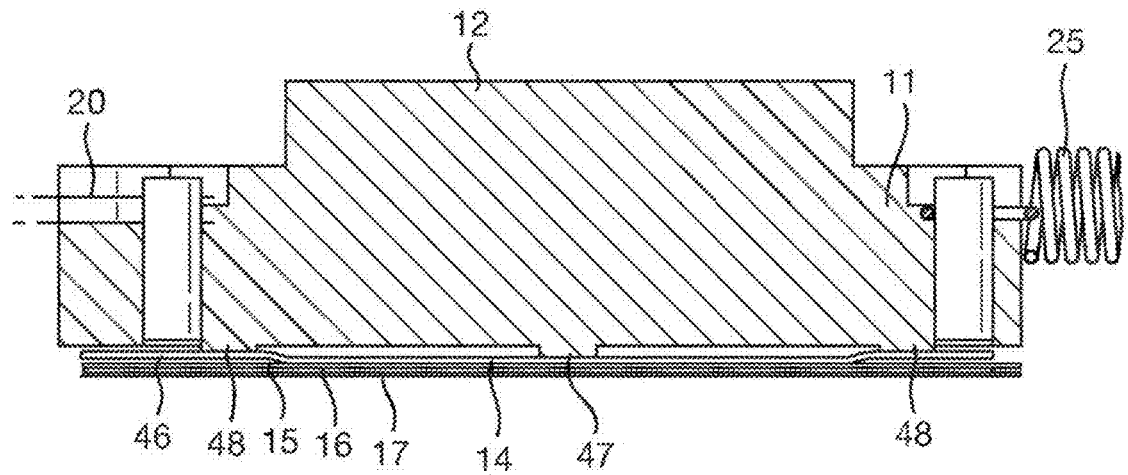
FIG. 6 is a side view of the first button assembly with a modified form of bearing.

Two button assemblies are described. In each case, the button assembly comprises a contact portion that detects contact between a user (e.g. a user's finger) and a button. The contact portion is provided below the button and may depress, deflect or bend when the button is pressed by a user. The contact portion may be, for example, a thin layer of material (e.g. a thin metal sheet) which may depress, deflect or bend when the button is pressed, or a plunger-like element which may exert a force onto another element when the button is pressed. The button assembly also comprises a sensor arrangement arranged to sense/detect the depression/deflection/bending of the contact portion. In embodiments, the contact portion may form an electrical connection with the sensor arrangement when the contact portion is depressed/deflected/bent. When the sensor arrangement senses/detects that the shape, form or arrangement of the contact portion has changed, the sensor arrangement may communicate this information to control circuitry to cause a drive signal to be applied to the shape memory alloy actuator (to drive movement of the button relative to the contact portion).

The first button assembly 10 is shown in FIGS. 1 and 2 and arranged as follows.

The first button assembly 10 includes a button 11 having a pressable surface 12 which is circular in this example. The button 11 may be formed from a single piece of material.

The first button assembly 10 may be arranged in a housing (not shown) and/or may be integrated into an electronic device. In either case, the pressable surface 12 is exposed so that it may be pressed by a user.

The first button assembly 10 includes a laminated structure 13 disposed beneath the button 11 and arranged as follows.

The laminated structure 13 includes a contact layer 14 immediately beneath the pressable surface 12. The contact layer 14 is depressable and acts as a contact portion. The contact layer 14 made from a spring metal such as phosphor bronze.

In order beneath the contact layer 14, the laminated structure 13 further includes a first insulating layer 15, a switch layer 16 and a second insulating layer 17. The first insulating layer 15 separates the contact layer 14 and the switch layer 16 and has an aperture 18 aligned with the button 11. Depression of the contact layer 14 into the aperture 18 brings the contact layer 13 into electrical contact with the switch layer 16. Thus, the contact layer 14 and the switch layer 16 act as first and second switch elements. The electrical contact may be sensed and so the switch layer 16 acts a sensor arrangement to sense depression of the contact layer 14 in the first button assembly 10.

In general, any other form of sensor arrangement could alternatively be used, for example a strain gauge.

The first button assembly 10 includes an SMA wire 20. Both ends of the SMA wire 20 are fixed relative to the contact layer 14 by being crimped by crimp portions 21 mounted on an insulating block 22. The SMA wire 20 is hooked at an intermediate position around a retaining portion 23 formed on the button 11 on one side. Thus, the two parts 24 of the SMA wire 20 extending from the retaining portion 20 extend laterally of the direction of travel of the button 11. Accordingly, the two parts 24 of the SMA wire 20, on contraction thereof, act in parallel to drive movement of the button 11 relative to the contact layer 13 in a lateral direction (preferably orthogonally) with respect to the direction of travel of the button 11 when pressed.

The diameter of the SMA wire 20 is selected to provide the desired balance of force, stroke and efficiency. The SMA wire 20 preferably has a diameter of 100 microns or less, or more preferably has a diameter of 35 microns or less. Although the first button assembly 10 includes a single SMA wire 20, in general any number of SMA wires could be included.

A coil spring 25 is connected at one end to the button 11 on the opposite side from the SMA wire 20. The coil spring 25 is fixed at its other end relative to the contact layer 14 and is arranged in tension. Thus, the coil spring 25 acts as a resilient biasing element to resiliently bias the SMA wire 20. In general, any number of springs could be included and/or any other form of resilient biasing could be provided, for example a coil spring in compression, a leaf spring and/or flexures.

The movement of the button 11 in the lateral direction is used to provide a haptic effect when the button 11 is pressed. In particular, this movement of the button 11 in the lateral direction gives a tactile sensation to the user that may be perceived as a change in the resistance force against pressing of the button 11, even though downwards movement of the button 11 is minimal.

A control circuit 30 for the first button assembly 10 is shown in FIG. 3. The control circuit 30 is connected to the contact layer 14 and the switch layer 16, and detects when an electrical contact between the contact layer 14 and the switch layer 16 occurs, due to depression of the contact layer 14 by pressing of the button 11. Further layers of insulator and conductor may be added to form a force sensitive switch, which may provide further reduced travel of the button.

The control circuit 30 is also connected to the SMA wire 20 and applies a drive signal thereto. In use, the control circuit 30 drives the SMA wire 20 to move the button 11 in response to detecting pressing of the button 11.

The drive signal resistively heats the SMA wire 20 causing it to contract. When the drive signal ceases the SMA wire 20 cools causing it to expand, due to the biasing effect of the coil spring 25. The resultant movement of the button 11 in the lateral direction is felt by the user pressing the button 11, thereby providing a haptic effect. The haptic effect is a tactile sensation that may feel to the user like the button 11 is being pushed down even though downwards travel is minimal.

Various forms of drive signal may be used to provide different haptic effects, for example a single pulse to provide a single movement of the button 11, or multiple pulses to provide a vibratory movement of the button 11.

The first button assembly 10 further includes a bearing arrangement 40 arranged as follows between the button 11 and the laminated structure 13 to bear the button 11 on the contact layer 14.

The bearing arrangement 40 is located in a recess 41 formed in the bottom of the button 11. The bearing arrangement 40 includes an insulating layer 42 provided on the surface of the button 11 with a bearing layer 43 on top formed of a suitable hard material such as a metal. Primary bearing balls 44 and secondary bearing balls 45 are disposed between, and contacting, the bearing layer 43 and the contact layer 14 to bear the button 11 on the contact later 14 as described in more detail below.

The primary bearing balls 44 and the secondary bearing balls 45 are located by a retaining sheet 46 disposed within the recess 41. The retaining sheet 46 has apertures 47 within which the primary bearing balls 44 and the secondary bearing balls 45 are disposed.

There are two primary bearing balls 44 arranged along a centre line aligned with the geometric centre of the pressable surface 12 of the button 11, which assists in transferring the force from the button 11 to the contact layer 14. In general there could any number of one or more primary bearing balls 44, but by providing plural primary bearing balls 44, the primary bearing balls 44 resist tilting along the direction of the centre line along which they arranged.

The primary bearing balls 44 contact the contact layer 14 continuously and support the button 11 thereon. Thus, when the button 11 is pressed, there is no lost travel of the button 11 prior to the contact layer 14 being contacted and the primary bearing balls 44 immediately depress the contact layer 14. In addition, when the button 11 is pressed, the primary bearing balls 44 act as a bearing and bear the movement of the button 11 in the lateral direction driven by the SMA wire 20 without breaking contact with the contact layer 14.

The secondary bearing balls 45 are provided to reduce tilt of the button 11 when it is pressed, as follows.

As best seen in FIGS. 4 and 5, the contact layer 14 is shaped into sprung arms 46 at positions laterally beside the primary bearing balls 44, aligned with the secondary bearing balls 45. The spring arms 46 are offset upwards from the remainder of the contact layer 14. The secondary bearing balls 45 contact the spring arms 46 which therefore support the secondary bearing balls 45 and act as a resilient element that accommodates travel of the button 11 when it is pressed. In addition, when the button 11 is pressed, the secondary bearing balls 45 act as a bearing and bear the movement of the button 11 in the lateral direction driven by the SMA wire 20. As the secondary bearing balls 45 and the spring arms 46 are disposed laterally beside the primary bearing balls 44, they reduce tilting of the button 11 along the lateral direction of the movement of the button 11 in the lateral direction. The tilt reduction is improved by the secondary bearing balls 45 being disposed on opposite sides of the primary bearing balls 45 along the lateral direction of the movement of the button 11 in the lateral direction.

Due to the spring arms 46 being offset upwards from the remainder of the contact layer 14, the diameter of the primary bearing balls 44 is larger than diameter of the secondary bearing balls 45. As the travel of the contact layer 14 required to make the contact when pressing the button 11 is defined by the thickness of the insulating layer 16, the difference in the diameters of the primary bearing balls 44 and the secondary bearing balls 45 needs to be greater than the thickness of the insulating layer 16.

In general, the spring arms 45 could be replaced by any other resilient element providing a similar effect, for example a piece of resilient material.

In the bearing arrangement 40, preferably the surfaces of the bearing layer 43, contact layer 14 and spring arms 46 are selected so that they are of a similar hardness to the primary bearing balls 44 and the secondary bearing balls 45 with which they are in contact, in order to prevent wear.

Although the primary bearing balls 44 and the secondary bearing balls 45 act as bearing elements in the first button assembly 10, they may be replaced by any other form of bearing element that provides the bearing function.

Figure 7:
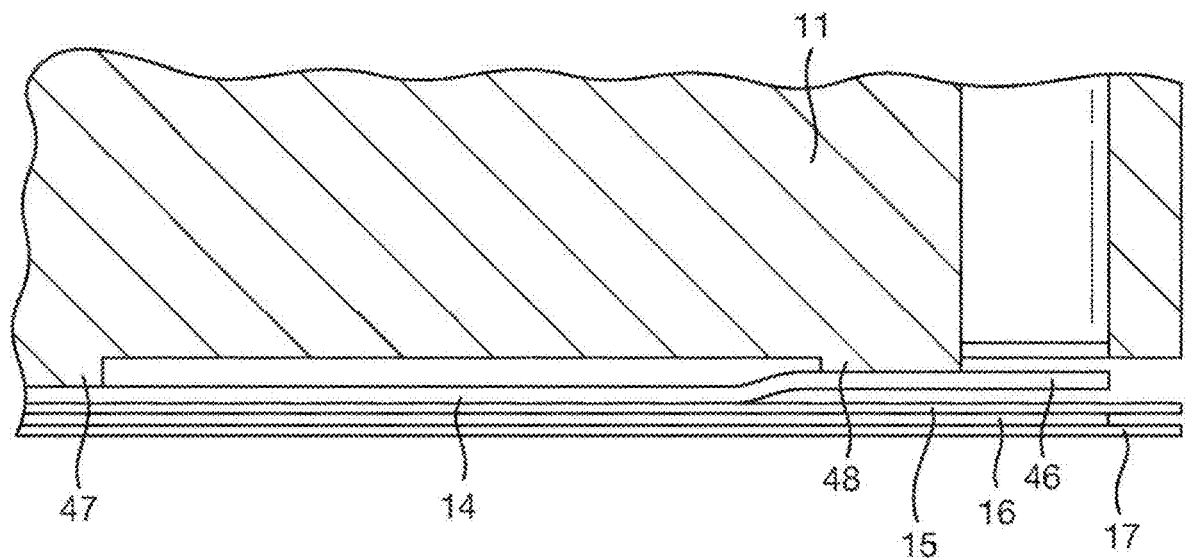
FIG. 7 is an enlarged part of FIG. 5.
Figure 8:
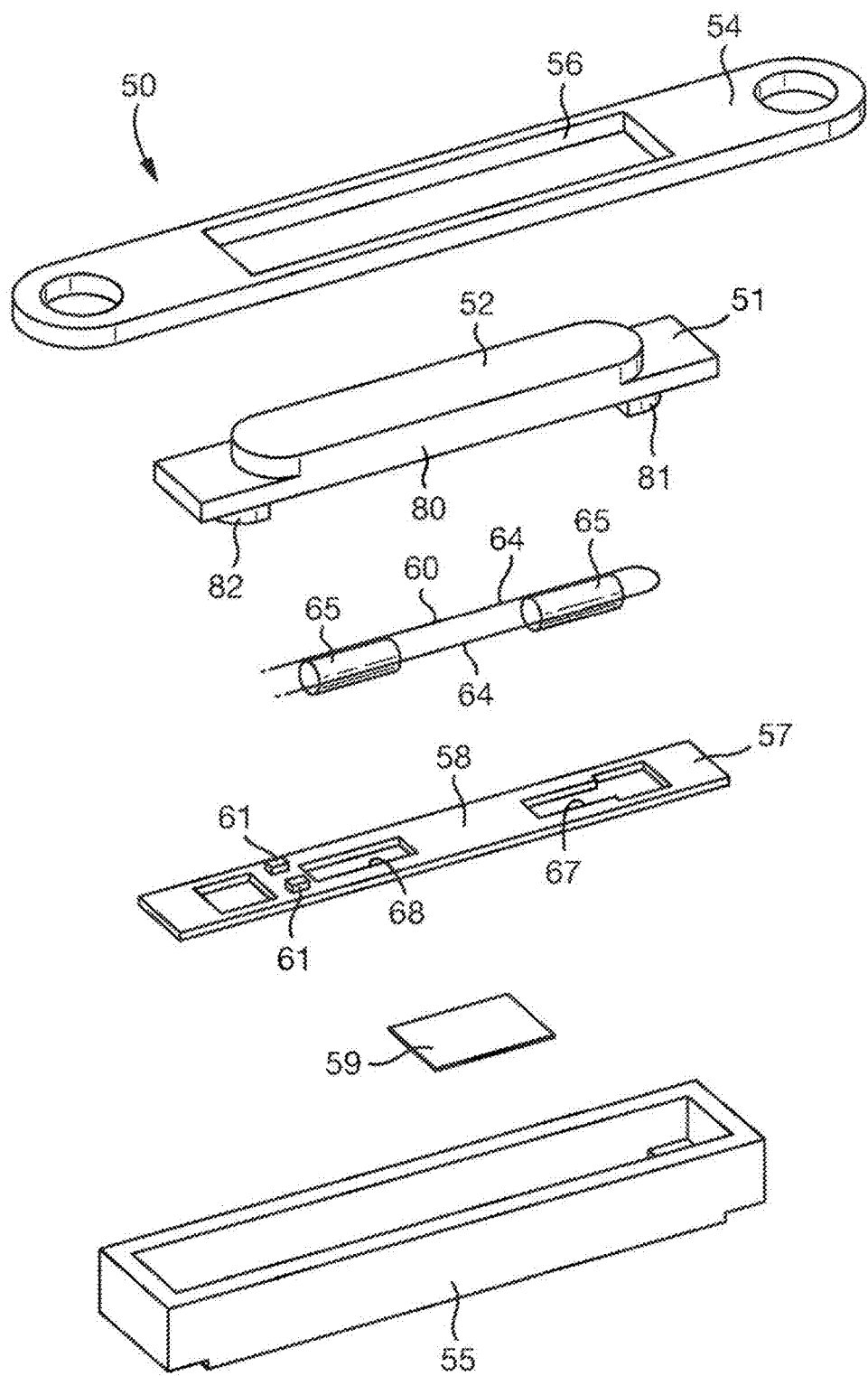
FIG. 8 is an exploded perspective view of a second button assembly.

In one example shown in FIGS. 6 and 7, the primary bearing balls 44 and the secondary bearing balls 45 are replaced by the primary sliding bearing members 47 and the secondary sliding bearing members 48, which protrude from the button 11 and act as bearing elements having the same function and effect as the primary bearing balls 44 and the secondary bearing balls 45. The primary sliding bearing members 47 and the secondary sliding bearing members 48 may be formed integrally with the button 11. The primary sliding bearing members 47 and the secondary sliding bearing members 48 may be made from, or are coated with, a low surface energy material (e.g. polytetrafluoroethylene (PTFE)) so that there is a low coefficient of friction between the bearing surfaces.

The second button assembly 50 is shown in FIGS. 7 to 10 and arranged as follows.

The second button assembly 50 includes a button 51 having a pressable surface 52 which is circular in this example. The button 51 may be formed from a single piece of material.

The second button assembly 50 includes an upper casing member 54 and a lower casing member 55 which are attached together to form a casing housing the other components of the second button assembly 50. The upper casing member 54 has an aperture 56 in which the button 51 fits, exposing the pressable surface 52 so that it may be pressed by a user. The second button assembly 50 may be integrated into an electronic device.

The second button assembly 50 includes a flexible layer 57 disposed beneath the button 51. The flexible layer 57 is mounted to the lower casing member 55 which therefore acts as a support for the flexible layer 57.

The flexible layer 57 includes a contact portion 58 disposed beneath the pressable surface 52 of the button 51. The contact portion 58 is depressable.

The second button assembly 50 also includes a strain gauge 59 fixed to the contact portion 58 on the underside of the flexible layer 57. The strain gauge 59 comprises a sheet whose resistance varies as the sheet is strained. Depression of the contact portion 58 may thus be detected by monitoring the change in the resistance of the strain gauge 59. The strain gauge 59 therefore acts a sensor arrangement to sense depression of the contact portion.

The strain gauge 59 has the advantage of being relatively thin, but any other form of sensor arrangement could alternatively be used, such as a switch arrangement.

The second button assembly 50 includes an SMA wire 60. Both ends of the SMA wire 60 are fixed to the flexible layer 57 by being crimped by crimp portions 61 mounted thereon. The flexible layer 57 may be a flexible printed circuit (FPC) carrying conductive tracks (not shown) connected to the SMA wire 60 and the strain gauge 59.

The SMA wire 60 is hooked at an intermediate position around a retaining portion 63 formed on a first stopper element 81 protruding downwardly from the button 51 as described further below. Thus, the two parts 64 of the SMA wire 60 extending from the retaining portion 60 extend laterally of the direction of travel of the button 51. Accordingly, the two parts 64 of the SMA wire 60, on contraction thereof, act in parallel to drive movement of the button 51 relative to the contact layer 53 in the lateral direction (preferably orthogonally) with respect to the direction of travel of the button 51 when pressed.

Furthermore, the two parts 64 of the SMA wire 60 are located beneath the pressable surface 52 of the button 51, thereby providing an actuator with a compact overall arrangement.

The diameter of the SMA wire 60 is selected to provide the desired balance of force, stroke and efficiency. The SMA wire 60 preferably has a diameter of 100 microns or less, or more preferably has a diameter of 35 microns or less. Although the second button assembly 50 includes a single SMA wire 60, in general any number of SMA wires could be included.

A coil spring 65 is connected at one end to the button 51 on the opposite side from the SMA wire 60. The coil spring 65 is fixed at its other end relative to the contact layer 54 and is arranged in tension. Thus, the coil spring 65 acts as a resilient biasing element to resiliently bias the SMA wire 60. In general, any number of springs could be included and/or any other form of resilient biasing could be provided, for example a coil spring in compression, a leaf spring and/or flexures.

The second button assembly 50 also includes two coil springs 65 and 66 which act as resilient biasing elements to resiliently bias the SMA wire 60 as follows. The coils springs 65 and 66 are each located between the two parts 64 of the SMA wire 60 and therefore beneath the pressable surface 52 of the button 51. This provides the biasing with a compact overall arrangement. The two coil springs 65 and 66 are located within respective apertures 67 and 68 in the flexible layer 57.

The coil springs 65 and 66 at one end engage the respective apertures 67 and 68, respectively, and at the other end engage the first stopper element 81 and a sliding bearing member 88, respectively, that protrude downwardly from the button 51 as described further below. In this manner, the coil springs 65 and 66 are held in compression between the button 51 and the contact portion 57, thereby providing a resilient biasing force to the SMA wire 60.

The movement of the button 51 in the lateral direction is used to provide a haptic effect when the button 51 is pressed.

In particular, this lateral movement gives a tactile sensation to the user that may be perceived as a change in the resistance force against pressing of the button 51, even though downwards movement of the button 51 is minimal.

A control circuit 70 for the second button assembly 50 is shown in FIG. 12. The control circuit 70 is connected to the strain gauge 59, and detects when the output of the strain gauge 59 indicates depression of the contact layer 54 by pressing of the button 51. Further layers of insulator and conductor may be added to form a force sensitive switch, if desired.

The control circuit 70 is also connected to the SMA wire 60 and applies a drive signal thereto. In use, the control circuit 70 drives the SMA wire 60 to move the button 51 in response to detecting pressing of the button 51.

The drive signal resistively heats the SMA wire 60 causing it to contract. When the drive signal ceases the SMA wire 60 cools causing it to expand, due to the biasing effect of the coil spring 65. The resultant movement of the button 51 in the lateral direction is felt by the user pressing the button 51, thereby providing a haptic effect. The haptic effect is a tactile sensation that may feel to the user like the button 51 is being pushed down even though downwards travel is minimal.

Various forms of drive signal may be used to provide different haptic effects, for example a single pulse to provide a single movement of the button 51, or multiple pulses to provide a vibratory movement of the button 51.

The second button assembly 50 further includes a sliding bearing member 80 arranged as follows between the button 51 and the flexible layer 57 to bear the button 51 on the contact portion 58.

The sliding bearing member 80 protrudes downwardly from the button 51 and may be formed integrally with the button 51. The sliding bearing member 80 is aligned with the geometric centre of the pressable surface 52 of the button 51 which assists in transferring the force from the button 51 to the contact portion 58. The sliding bearing member 80 is therefore located between the two parts 64 of the SMA wire 60 which provides a compact arrangement.

The sliding bearing member 80 contacts the contact portion 58 continuously and supports the button 51 thereon. Thus, when the button 51 is pressed, there is no lost travel of the button 51 prior to the contact portion 58 being contacted and the sliding bearing member 80 immediately depresses the contact portion 58. In addition, when the button 51 is pressed, the sliding bearing member 80 acts as a bearing and bears the movement of the button 51 in the lateral direction driven by the SMA wire 60 without breaking contact with the contact portion 58.

The sliding bearing member 80 may be made from, or are coated with, a low surface energy material (e.g. polytetrafluoroethylene (PTFE)) so that there is a low coefficient of friction between the bearing surfaces.

Although in this example a single sliding bearing member 80 is provided, more generally there could be any number of sliding bearing members.

Although the sliding bearing member 80 acts as a bearing element in the second button assembly 50, it may be replaced by any other form of bearing element that provides the bearing function, for example one or more bearing balls.

The second button assembly 50 further includes first and second stopper elements 81 and 82 which are provided to reduce tilt of the button 51 when it is pressed, as follows.

As best seen in FIGS. 9 and 10, the first and second stopper elements 81 and 82 protrude downwardly from the button 51. The first and second stopper elements 81 and 82 may be formed integrally with the button 51.

The first and second stopper elements 81 and 82 protrude towards the lower casing member 55, through respective apertures 83 and 84 formed in the flexible layer 57. However, the first and second stopper elements 81 and 82 are spaced from the lower casing member 55 by a clearance that is selected to limit the tilt of the button 51 when it is pressed by the user.

The first and second stopper elements 81 and 82 are disposed on opposite sides of the sliding bearing member 80 in the lateral direction along which the relative lateral motion of the button 51 is driven, thereby limiting the tilt of the button 51 in that direction.

Thus, the first and second stopper elements 81 and 82 in the second button assembly 50 have a similar effect of reducing the degree of tilt to the secondary bearing balls 45 and the spring arms 46 in the first button assembly 10. Accordingly, these features may be interchanged in the first and second button assemblies 10 and 50.

The button assemblies described herein may be modified to make them waterproof. For example, when the button assembly is arranged in a housing and/or integrated into an electronic device, the pressable surface is exposed so that it may be pressed by a user. However, this may result in a small gap between the pressable surface and the housing or casework of an electronic device. The gap may be filled with sealant, which may prevent liquid from entering the housing/casework. Additionally or alternatively, the SMA wire may be coated with an insulative material. The ends of the SMA wire which are crimped may be coated with a sealant. The coating may be a conformal insulating coating such as parylene. If the SMA wire is coated but the gap is not sealed, liquid may be able to enter the button assembly, but the conformal coating may prevent liquid from flowing any further into the housing/casework.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A button assembly, comprising:
   a button having a pressable surface;
   a contact portion beneath the button, the contact portion being depressable;
   a sensor arrangement arranged to sense depression of the contact portion;
   a shape memory alloy actuator arranged, on contraction thereof, to drive movement of the button relative to the contact portion in a lateral direction with respect to a direction of travel of the button when pressed; and
   at least one primary bearing element arranged to contact and depress the contact portion when the button is pressed, and to bear said movement of the button in said lateral direction without breaking contact with the contact portion when the button is pressed, wherein the or each primary bearing element is a ball bearing.

2. The button assembly as claimed in claim 1, wherein the at least one primary bearing element contacts the contact portion continuously and supports the button thereon.

3. The button assembly as claimed in claim 1, wherein the at least one primary bearing element is aligned with a geometric centre of the pressable surface.

4. The button assembly as claimed in claim 1, wherein the at least one primary bearing element comprises plural bearing elements arranged along a centre line aligned with a geometric centre of the pressable surface.

5. The button assembly as claimed in claim 1, wherein the button assembly further comprises:
   at least one resilient element arranged laterally beside the at least one primary bearing element; and
   at least one secondary bearing element which is in contact with the at least one resilient element and supports the button thereon, and the at least one resilient element being arranged to accommodate travel of the button and the at least one secondary bearing element being arranged to bear said movement of the button in said lateral direction for reducing tilt of the button.

6. The button assembly as claimed in claim 5, wherein the at least one secondary bearing element comprises secondary bearing elements disposed on opposite sides of the at least one primary bearing element.

7. The button assembly as claimed in claim 1, wherein the shape memory alloy actuator comprises at least one shape memory alloy wire having a diameter of 100 microns or less.

8. The button assembly as claimed in claim 7, wherein both ends of the at least one shape memory alloy wire are fixed relative to the contact portion and the at least one shape memory alloy wire is hooked at an intermediate position around a retaining portion formed on the button, so that two parts of the at least one shape memory alloy wire which extend from the retaining portion are arranged to drive said movement of the button in said lateral direction in parallel.

9. The button assembly as claimed in claim 1, further comprising at least one resilient biasing element arranged to resiliently bias the shape memory alloy actuator.

10. The button assembly as claimed in claim 1, wherein the contact portion comprises a first switch element and the sensor arrangement comprises a second switch element arranged such that depression of the contact portion brings the first and second switch elements into electrical contact.

11. The button assembly as claimed in claim 1, wherein the sensor arrangement comprises a strain gauge.

12. A method for delivering a haptic sensation using the button assembly according to claim 1, the method comprising:
   sensing depression of the contact portion; and
   applying a drive signal to the shape memory alloy actuator to drive movement of the button relative to the contact portion.

13. The method as claimed in claim 12 further comprising:
   selecting, prior to applying the drive signal, a drive signal from a set of drive signals, where each drive signal provides a particular haptic effect.

14. A non-transitory data carrier carrying processor control code to implement the method of claim 12.

15. Circuitry for delivering a haptic sensation using the button assembly according to claim 1, the circuitry comprising:
   a detection module for sensing depression of the contact portion; and
   a drive module for applying a drive signal to the shape memory alloy actuator to drive movement of the button relative to the contact portion.

16. The circuitry as claimed in claim 15 wherein the drive module selects, prior to applying the drive signal, a drive signal from a set of drive signals, where each drive signal provides a particular haptic effect.

* * * * *